United States Patent Office 2,802,836
Patented Aug. 13, 1957

2,802,836

3-CYCLOHEXYLOXYPHTHALIDE

Donald D. Wheeler and David C. Young, Midland, Mich., assignors to The Dow Chemical Company, Midland, Mich., a corporation of Delaware No Drawing. Application April 30, 1956, Serial No. 581,354

1 Claim. (Cl. 260—343.3)

This invention is directed to 3-cyclohexyloxyphthalide having the structure

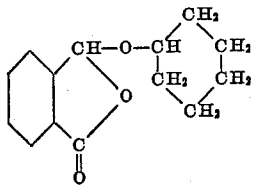

This new compound is a light-colored solid, soluble in organic solvents such as benzene and acetone, and substantially insoluble in water. It is valuable as a germicide and adapted to be employed for the control of bacterial organisms.

The new compound of this invention is conveniently prepared by causing phthalaldehydic acid to react with cyclohexanol. The terms "phthalaldehydic acid" and "3-hydroxyphthalide" refer to a compound having the structure

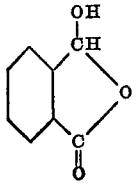

Phthalaldehydic acid is often represented in the literature as having the structure

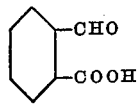

However, the acid employed in this invention and prepared as hereinafter described exists almost entirely in the closed ring, 3-hydroxyphthalide structure, as observed from a study of its infrared absorption spectrum. The infrared spectrum supports the closed ring 3-cyclohexyloxyphthalide structure for the product.

In a preferred method for carrying out the reaction, phthalaldehydic acid and cyclohexanol are mixed and heated in the temperature range of from 90° to 120° C. Reaction takes place with the formation of 3-cyclohexyloxyphthalide product and water of reaction. The latter begins to reflux during the heating period and the mixture is thereafter maintained under reflux for one to four hours. On completion of the heating, the reaction mixture is poured into water whereupon the product precipitates as a solid. The latter may be purified by conventional procedures.

In a representative operation, 50.1 grams (0.5 mole) of cyclohexanol and 75.0 grams (0.5 mole) of phthalaldehydic acid were mixed and heated at about 110° C. under reflux for three hours. The mixture was then cooled to 90° C. and poured into 600 milliliters of water whereupon a solid precipitated. The mixture was filtered to obtain a 3-cyclohexyloxyphthalide product melting at 79°–81° C. The latter was obtained in a yield of 85 grams or 73 percent of theoretical.

The new compound of the present invention is useful as a germicide and may be employed for the control of bacterial organisms. In a representative determination, a solid nutrient agar medium saturated with 3-cyclohexyloxyphthalide was streaked with *Staphylococcus aureus* and incubated at 30° C. for three days. At the end of this period, complete inhibition of the test organism was observed.

The phthalaldehydic acid employed in this invention may be prepared by photochlorinating o-xylene to obtain α,α,α,α′,α′-pentachloro-o-xylene by passing chlorine gas into o-xylene while illuminating with sun lamps. The resulting chlorinated o-xylene is then heated with aqueous constant-boiling hydrochloric acid containing 10 percent ferric chloride solution to obtain phthalaldehydic acid, as more fully disclosed and claimed in a copending application of James D. Head and Owen D. Ivins, Serial Number 279,682, filed March 31, 1952, now Patent No. 2,748,162.

We claim:
3-cyclohexyloxyphthalide.

References Cited in the file of this patent

Grove: Biochem. J. 54, p. 664–673 (1953).
Auwers et al.: Berichte 52, pp. 587,596 (1919).
Kohlrausch et al.: Berichte 77, p. 471 (1944).
Racine: Annalen 239 p. 83 (1887).